(12) United States Patent
Karwan

(10) Patent No.: US 8,289,702 B2
(45) Date of Patent: Oct. 16, 2012

(54) UNIVERSAL REARWARD KEYBOARD WITH MEANS FOR INSERTING A PORTABLE COMPUTATIONAL DISPLAY

(76) Inventor: Sihar Ahmad Karwan, Sterling, VA (US)

( * ) Notice: Subject to any disclaimer, the term of this patent is extended or adjusted under 35 U.S.C. 154(b) by 0 days.

(21) Appl. No.: 12/805,631

(22) Filed: Aug. 11, 2010

(65) Prior Publication Data

US 2012/0039021 A1   Feb. 16, 2012

(51) Int. Cl.
*G06F 1/16* (2006.01)
*H05K 5/00* (2006.01)
*H05K 7/00* (2006.01)

(52) U.S. Cl. ................. 361/679.55; 455/575.8

(58) Field of Classification Search . 361/679.08–679.21, 679.23, 679.26–679.3, 361/679.55, 679.56; 455/575.8
See application file for complete search history.

(56) References Cited

U.S. PATENT DOCUMENTS

| | | | | |
|---|---|---|---|---|
| 5,410,333 A * | 4/1995 | Conway | ................. | 345/169 |
| 5,515,305 A * | 5/1996 | Register et al. | ................. | 708/145 |
| 5,586,002 A * | 12/1996 | Notarianni | ................. | 361/679.26 |
| 5,644,338 A * | 7/1997 | Bowen | ................. | 345/168 |
| 5,864,766 A * | 1/1999 | Chiang | ................. | 455/572 |
| 6,073,136 A * | 6/2000 | Bertram et al. | ................. | 1/1 |
| 6,107,988 A * | 8/2000 | Phillipps | ................. | 345/156 |
| 6,118,432 A * | 9/2000 | Kotorov et al. | ................. | 345/168 |
| 6,121,960 A * | 9/2000 | Carroll et al. | ................. | 345/173 |
| 6,297,752 B1 * | 10/2001 | Ni | ................. | 341/22 |
| 6,456,487 B1 * | 9/2002 | Hetterick | ................. | 361/679.3 |
| 6,507,336 B1 * | 1/2003 | Lunsford | ................. | 345/168 |
| 6,512,511 B2 * | 1/2003 | Willner et al. | ................. | 345/169 |
| D480,726 S * | 10/2003 | Yokota | ................. | D14/396 |
| 6,671,170 B2 * | 12/2003 | Webb et al. | ................. | 361/679.09 |
| 6,847,806 B2 * | 1/2005 | Curtis et al. | ................. | 455/90.3 |
| 6,909,424 B2 * | 6/2005 | Liebenow et al. | ................. | 345/169 |
| 6,914,776 B2 * | 7/2005 | Kim | ................. | 361/679.11 |
| 6,977,811 B1 * | 12/2005 | Fleck et al. | ................. | 361/679.18 |
| 6,999,804 B2 * | 2/2006 | Engstrom et al. | ................. | 455/575.3 |
| 7,054,146 B2 * | 5/2006 | Sutton et al. | ................. | 361/679.28 |
| 7,088,339 B2 * | 8/2006 | Gresham | ................. | 345/168 |
| 7,230,823 B2 * | 6/2007 | Richardson et al. | ................. | 361/679.25 |
| 7,269,000 B2 * | 9/2007 | Webb et al. | ................. | 361/679.27 |
| 7,333,321 B2 * | 2/2008 | Sutton et al. | ................. | 361/679.09 |
| D567,240 S * | 4/2008 | Griffin | ................. | D14/392 |
| 7,400,496 B2 * | 7/2008 | Sauer et al. | ................. | 361/679.09 |
| 7,428,427 B2 * | 9/2008 | Brunstrom et al. | ................. | 455/550.1 |
| D587,896 S * | 3/2009 | Aipa | ................. | D3/201 |
| D621,396 S * | 8/2010 | Lee et al. | ................. | D14/252 |
| 7,778,431 B2 * | 8/2010 | Feng et al. | ................. | 381/160 |
| 7,782,610 B2 * | 8/2010 | Diebel et al. | ................. | 361/679.56 |
| 7,843,686 B2 * | 11/2010 | McEwan et al. | ................. | 361/679.55 |
| 7,881,055 B2 * | 2/2011 | Brandenberg et al. | ................. | 361/679.3 |
| 7,889,498 B2 * | 2/2011 | Diebel et al. | ................. | 361/679.56 |
| 2001/0003707 A1 * | 6/2001 | Moriya | ................. | 455/566 |
| 2002/0147035 A1 * | 10/2002 | Su | ................. | 455/572 |
| 2003/0146902 A1 * | 8/2003 | Sandbach et al. | ................. | 345/168 |
| 2003/0184958 A1 * | 10/2003 | Kao | ................. | 361/683 |
| 2004/0097256 A1 * | 5/2004 | Kujawski | ................. | 455/550.1 |
| 2005/0104855 A1 * | 5/2005 | Grossmeyer | ................. | 345/169 |
| 2006/0058073 A1 * | 3/2006 | Kim | ................. | 455/573 |
| 2006/0105722 A1 * | 5/2006 | Kumar | ................. | 455/90.3 |
| 2007/0152633 A1 * | 7/2007 | Lee | ................. | 320/114 |
| 2007/0236180 A1 * | 10/2007 | Rodgers | ................. | 320/115 |

(Continued)

*Primary Examiner* — Adrian S Wilson

(57) ABSTRACT

This present embodiment relates in general to an article of hardware providing a shell-like member configured to inserting and docking a standalone hand held computational display, the article of hardware further comprising of a keyboard aligned to the user's fingers when the user grips the article of hardware.

23 Claims, 5 Drawing Sheets

U.S. PATENT DOCUMENTS

| | | | |
|---|---|---|---|
| 2007/0247793 A1* | 10/2007 | Carnevali | 361/681 |
| 2007/0268261 A1* | 11/2007 | Lipson | 345/169 |
| 2008/0053770 A1* | 3/2008 | Tynyk | 190/100 |
| 2008/0096620 A1* | 4/2008 | Lee et al. | 455/575.8 |
| 2009/0061956 A1* | 3/2009 | Matsuoka | 455/575.1 |
| 2009/0114556 A1* | 5/2009 | Tai et al. | 206/320 |
| 2009/0219684 A1* | 9/2009 | Mori | 361/679.56 |
| 2009/0286575 A1* | 11/2009 | Taniguchi et al. | 455/566 |
| 2009/0312058 A9* | 12/2009 | Wood et al. | 455/566 |
| 2010/0061055 A1* | 3/2010 | Dabov et al. | 361/679.56 |
| 2011/0188176 A1* | 8/2011 | Kim | 361/679.01 |

* cited by examiner

UNIVERSAL REARWARD KEYBOARD WITH MEANS FOR INSERTING A PORTABLE COMPUTATIONAL DISPLAY

CROSS-REFERENCE TO RELATED APPLICATIONS

Reference Cited

U.S. Patent Documents

| | | | |
|---|---|---|---|
| 5,410,333 | August 1997 | Conway | 361/680 |
| US 7,324,019 B2 | Jan 29 | Levenson | 341/22 |
| US 7,088,339 B2 | August 2006 | Gresham | 345/168 |
| US 6,939,066 B2 | September 2005 | Goodenough | 400/477 |
| US 6,822,854 B2 | November 2004 | Te Maarssen | 361/680 |
| US 6,297,752 B1 | October 2001 | Ni | 341/22 |
| 6,118,432 | September 2000 | Kotorov | 345/168 |
| 6,107,988 | August 2000 | Phillipps | 345/156 |
| US 6,909,424 B2 | June 2005 | Liebenow | 345/169 |
| US 7,012,595 B2 | March 2006 | Lu | 345/173 |
| US 6,630,924 B1 | October 2003 | Peck | 345/168 |
| US 7,378,991 B2 | May 2008 | Dietz | 341/22 |
| US 6,977,811 B1 | December 2005 | Fleck | 361/686 |
| 6,121,960 | September 2000 | Carroll | 345/173 |
| US 2005/0104855 A1 | May 2005 | Groosmeyer | 345/169 |
| 6,118,432 | September 2000 | Kotorov | 345/168 |
| US 6,512,511 B2 | January 2003 | Willner | 345/169 |
| US 7,400,496 B2 | July 2008 | Saver | 361/680 |
| US D567,240 S | April 2008 | Griffin | D14/392 |
| 5,515,305 | May 1996 | Register | 364/709.15 |
| 6,507,336 | January 2003 | Lunsford | 345/168 |

Foreign Patent Documents

Not Applicable

Other Publications

Not Applicable

CROSS-REFERENCE

Not Applicable

FEDERALLY SPONSORED RESEARCH

Not Applicable

SEQUENCE LISTING OR PROGRAM

Not Applicable

BACKGROUND OF THIS PRESENT EMBODIMENT

1. Field of this Present Embodiment

This present embodiment relates in general to an article of hardware, said hardware providing a shell-like member comprising of an ergonomically designed keyboard configured for the user to insert and dock a computational display into said article of hardware.

2. Prior Art
By Patent Numbers:

| | | | |
|---|---|---|---|
| U.S. Pat. No. 6,297,752 | October 2001 | Ni | 341/22 |

Backside Keyboard for a Notebook or Gamebox

The disadvantage of Ni's patent application '752 for his invention is that his invention is for a complete electronic device. As Ni states in his patent " . . . electronic device, said device being one of
(i) a notebook computer,
(ii) a personal digital assistant computer;
(iii) a game;
mounted in a chassis . . . " and therefore does not allow the user to insert a device into his invention.

Additionally Ni's patent application refers to a switch in his words he states "a two position switch wherein, in one position, said screen presents an image of said keyboard aligned with said keyboard whereby a user is presented with a visual guide to keys on said keyboard and, in another position, presents data". Ni' makes no reference to any application for super imposing an image of the keyboard on top of the screen content simultaneously. Ni's patent application does not refer to any infinitely adjustable intensity of the keyboard image or state the ability to superimpose a keyboard layout of its keys on the displayed content simultaneously.

| | | | |
|---|---|---|---|
| US 6,909,424 B2 | June 2005 | Liebenow | 345/169 |

Digital Information Appliance Input Device
The disadvantage of Liebenow's patent '424 is that his invention is for a complete appliance.

| | | | |
|---|---|---|---|
| US 2005/0104855 A1 | May 2005 | Grossmeyer | 345/169 |

Double Side Transparent Keyboard for Miniaturized Electronic Appliances

The disadvantage of Grossmeyer's patent '855 is in his first inventions his patent states "central area for holding a miniaturized electronic device" therefore his invention cannot hold a full size device. The device must be taped on by the use of a double-sided tape with his transparent miniaturized infrared sensors keyboard on the sides. Additionally the keyboard is a standard QWERTY keyboard and cannot be reconfigured to alien with the users fingers for use from behind. The user must see through the transparent keyboard to use the keys from the back. The size of the miniaturized device is limiting the size of the device that can be taped onto the keyboard without obstructing the keyboard from view or use.

In his second invention, his patent states "keyboard . . . having a miniaturized appliance embedded within the keyboard" requires the keyboard to have a screen. The device's display is not used; instead the keyboard is to provide a display screen on the first side with "an image of the keyboard superimposed upon the application program including individual keys on the display side of the keyboard." Grossmeyers' keyboard, which is "electronically transparent", requires a display, advanced software, and multiple sensors to detect the location of the user's fingers for displaying onto the first display screen. The re-configurable keyboard requires multiple sensors, cameras, touch screens, and/or other input sensors to detect the input of a key being pressed. Additionally "an image of the keyboard superimposed upon the application program including individual keys on the display side of the keyboard" is ever present making the display cluttered and hard to decipher with multiple images one on top of the other.

Foreign Patent Documents

Not applicable
Listed below are additional citations in similar fields but do not intruding on the scope of this present embodiment.

| | | | |
|---|---|---|---|
| 6,121,960 | September 2000 | Carroll | 345/173 |
| US 6,977,811 B1 | December 2005 | Fleck | 361/686 |
| US 7,378,911 B2 | May 2008 | Dietz | 341/22 |
| 5,410,33 | April 1995 | Conway | 345/169 |
| 6,118,432 | September 2000 | Kotorov | 345/168 |
| US 6,512,511 B2 | January 2003 | Willner | 345/169 |
| US 7,400,496 B2 | July 2008 | Saver | 361/680 |
| US D567,240 S | April 2008 | Griffin | D14/392 |
| 5,515,305 | May 1996 | Register | 364/709.15 |
| 6,507,336 | January 2003 | Lunsford | 345/168 |

BRIEF SUMMARY OF THIS PRESENT EMBODIMENT

This present embodiment exhibits article of hardware comprising of a shell-like member configured for the user to insert and dock a computational display into said article of hardware. Additionally the shell-like member provides an ergonomically designed keyboard for the user to use from the rear of the shell-like member while holding the shell-like member.

BRIEF DESCRIPTION OF THE DRAWINGS

Description of Figures

Figure 1:
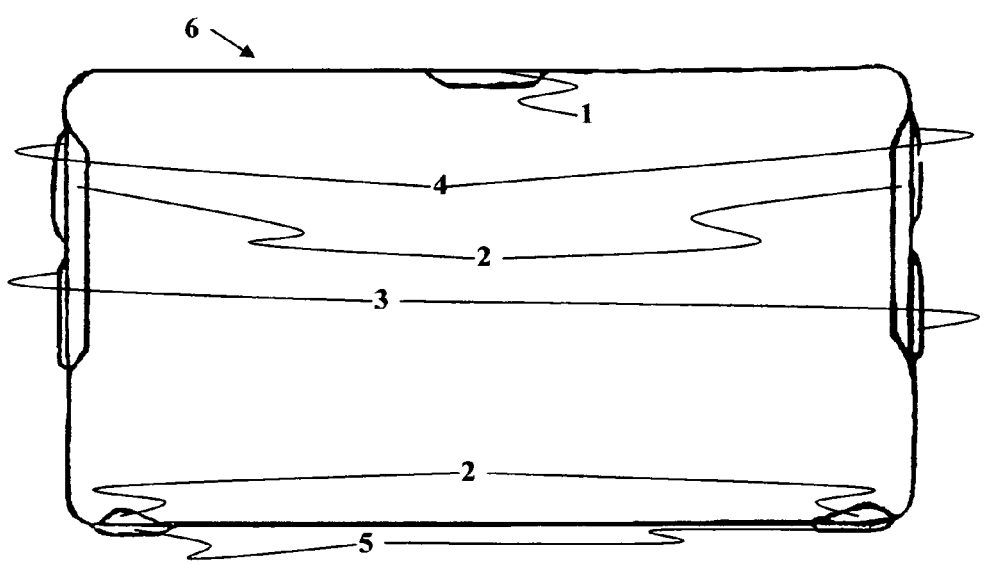
Figure 2:
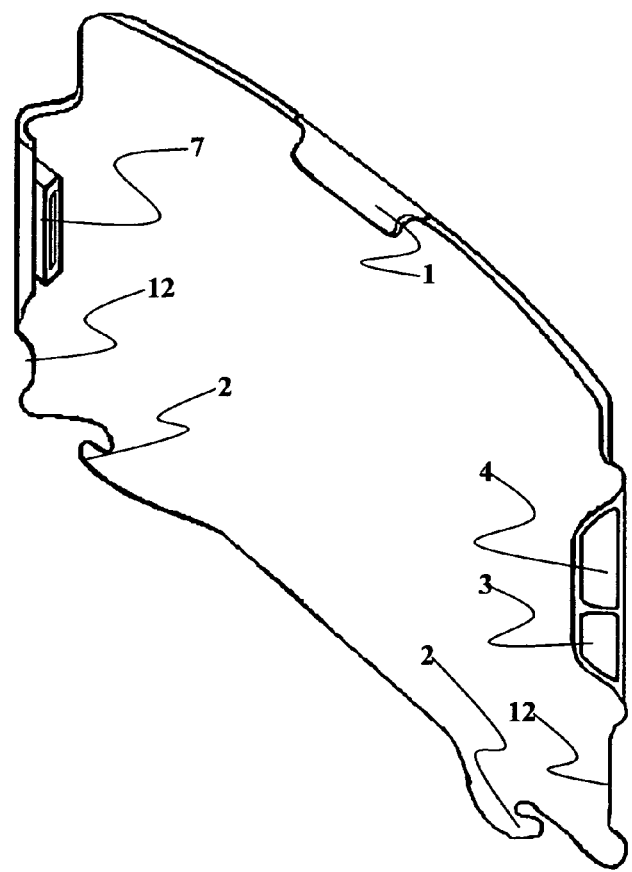
Figure 3:
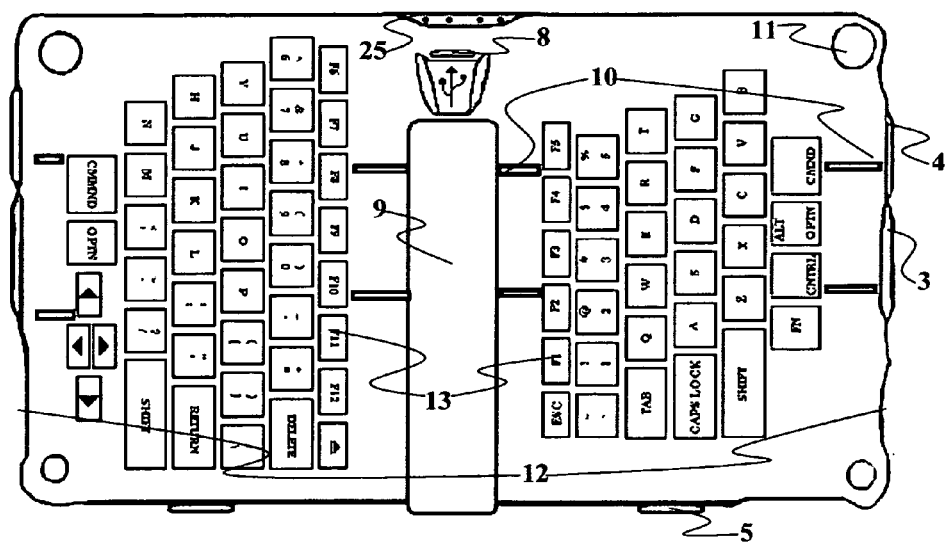
Figure 4:
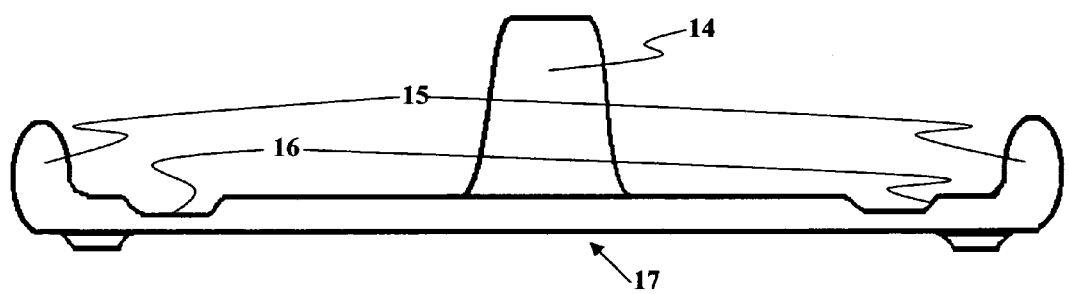
Figure 5:
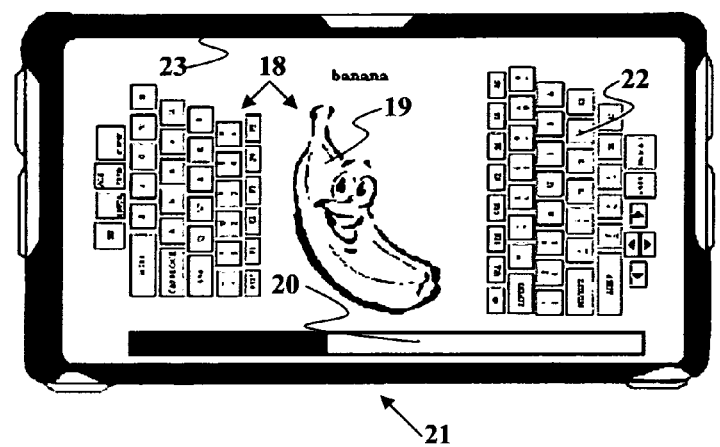

FIG. 1 is a depiction of this present embodiment's front face perspective view.
FIG. 2 is a depiction of this present embodiment's front cavity perspective view highlighting this present embodiment's docking port.
FIG. 3 is a depiction of this present embodiment's rear perspective view.
FIG. 4 is a depiction of this present embodiment's front perspective view of its mechanism for drop-in charging.
FIG. 5 is a depiction of this present embodiment's front perspective view with a computational display inserted into this present embodiment; displaying superimposed keyboard image simultaneously on top of displayed data content while the intensity is being adjusted.

| DESCRIPTION OF REFERENCE NUMERALS | |
|---|---|
| 1 | Mechanism for releasing |
| 2 | Mechanism for holding |
| 3 | Mechanism for gripping |
| 4 | Space bar |
| 5 | Feet comprising mechanism for charging |
| 6 | Shell-like member |
| 7 | Mechanism for interfacing |
| 8 | Mechanism for I/O connections |
| 9 | Mechanism for propping |
| 10 | Mechanism for adjusting keyboard member |
| 11 | Mechanism for placing |
| 12 | Mechanism for accessing controls |
| 13 | Keyboard member |
| 14 | Mechanism for support |

-continued

| DESCRIPTION OF REFERENCE NUMERALS | |
|---|---|
| 15 | Mechanism for securing |
| 16 | Mechanism for charging |
| 17 | Mechanism for drop-in charging |
| 18 | Superimposed keyboard image and data content |
| 19 | Displayed data content |
| 20 | Superimposed keyboard image intensity indicator |
| 21 | Computational display inserted into this present embodiment |
| 22 | Superimposed keyboard image |
| 23 | Computational display |
| 24 | Tab |
| 25 | Screw like mechanism |

DETAILED DESCRIPTION OF THE DRAWINGS

Specifications

FIG. 1 shows the various parts of this present embodiment, such as the shell-like member 6, the shell-like member 6 is configured to be a rigid or somewhat-rigid shape formed to closely resemble the computational display's 23 exterior structure. The shell-like member 6 is used as the structure of this present embodiment as well as to provide a layer of protection for the computational display 23. The mechanism for releasing 1 is one such example of the various parts of this present embodiment that the shell-like member 6 comprises. The mechanism for releasing 1 comprises of a screw like mechanism 25 located on the top rear of the mechanism for releasing 1. Once the screw like mechanism 25 is removed, the mechanism for releasing 1 can be moved out of the way to allow the user to insert a computational display 23 into the face cavity of the shell-like member. The mechanism for releasing 1 secures the computational display 23 once the computational display 23 is inserted into the face cavity of this shell-like member and the screw like mechanism 25 is reinserted. The mechanism for holding 2 are tabs that are configured to come around the computational display 23 as to secure the computational display 23 once the computational display 23 is inserted into the face cavity of this present embodiment. The mechanism for holding 2 act like fingers wrapping around the computational display 23 from the rear to the front of this present embodiment. This is best illustrated in FIG. 2. The mechanism for releasing 1 is similar to the mechanism of holding 2, but very slightly in that the mechanism for releasing 1 is configured to be moved out of the way allowing the computational display 23 to be inserted into the face cavity of the shell-like member 6. The mechanism for gripping 3 are areas dedicated to assist the user's grip. In this present embodiment, the mechanism for gripping 3 is accomplished by adding a high friction texture or material to the dedicated areas. The mechanism for gripping 3 is configured such that the user can grip this present embodiment with the palm of their hands and allowing the users thumbs and fingers to be free to use the ergonomically placed space bar 4 and keyboard member 13. This present embodiment has feet comprising mechanism for charging 5. The feet comprising mechanism for charging 5 has two functions that allow this present embodiment to stand and/or charge, the first function allows this current embodiment to stand on a surface similar to the way a picture frame stands on a surface. The second function of the feet comprising mechanism for charging 5 comprises of contact points on the rear to allow the computational display 23 to charge its batteries when placed on the mechanism for drop-in charging 17 shown in FIG. 4.

FIG. 2 shows the mechanism for interfacing 7. The mechanism for interfacing 7 is a receptacle that is matched to the particular computational display 23 whereby allowing this present embodiment to interface or dock with the computational display 23. The location for the mechanism for interfacing 7 is matched to the location of the computational display 23 as to allow the computational display 23 to automatically dock when the user inserts the computational display 23 into the shell-like member 6 of this present embodiment. Now referring to FIG. 3, a depiction of this present embodiment's rear perspective view, we can see the mechanism of I/O connections 8; the mechanism of I/O connections 8 is configured to be a USB, mini USB, or such. The mechanism of I/O connections 8 allows a device using the mechanism of I/O connections 8 to communicate with the computational display 23 through the mechanism for interfacing 7 and is further configured to charge the computational display 23. The mechanism of I/O connections 8 is one of the I/O ports that this present embodiment allows the computational display 23 to communicate with. Additional I/O ports are hidden from view in a compartment behind the mechanism for propping 9. The mechanism for propping 9 is configured to be retractable whereby allowing this present embodiment to stand on a surface similar to the way a picture frame stands on a surface. The mechanism for propping 9 is further configured with additional I/O connections internally (not shown, commonly known in the art) to allow for additional connections such as additional memory or components such as blue tooth or camera. The mechanism for adjusting keyboard member 10 allows the user to adjust the position of the keyboard member 13 for an ergonomic fit. The mechanism for adjusting keyboard member 10 are shown as tracks in this present embodiment, which allows the keyboards to be moved freely on all three axes, additional tracks are located on the underside of keyboard member 13 (not shown, commonly known in the art). The mechanism for placing 11 is configured to allow the user to adjust the rear height of this present embodiment when this embodiment is place flat on a surface. The mechanism for accessing controls 12 are notches that match the locations of the particular computational displays controls allowing the user to access the computational display 23 controls. The keyboard member 13 is configured for ergonomic fit to allow the user to hold the inserted computational display 23 in this present embodiment and input data simultaneously. Additionally, the keyboard member 13 can be disengaged or disabled from computational display 23 by the use of a switch or a software program (not shown, conventionally known in the art). The mechanism for interfacing 7 can also be disengaged or disabled from the computational display 23 in the same way that the keyboard member 13 is disengaged or disabled.

FIG. 4 is a depiction of this present embodiment's front view of its mechanism for drop-in charging 17. The mechanism for drop-in charging 17 is configured to allow this present embodiment to be dropped into place and is propped in place by mechanism for support 14. Additionally, the mechanism for securing 15 secures the present embodiment in place and aligns the mechanism for charging 16 and the feet comprising mechanism for charging 5 so that the computational display 23 can be charged with ease.

FIG. 5 is a depiction of this present embodiment's superimposed keyboard image 22 and displayed data content while the intensity is adjusted. The displayed data content 19 will remain on the computational displayed screen while superimposed keyboard image 22 is imposed on top of the data content. The superimposed keyboard image 22 is adjustable in its intensity from only screen data content all the way to only keyboard image and all the ratio of the two in-between. While the keyboard image is adjusted a superimposed keyboard image intensity indicator 20 will be displayed to indicate the level of intensity, form zero representing no keyboard image to infinity representing only keyboard image. Additionally, when the keyboard image is displayed and the user presses a key, the image of said key will be magnified or highlighted. Furthermore, the mechanism for disengaging keyboard (not shown but commonly known in the art) allows the keyboard member 13 of this present embodiment to disengage ether by software or hardware to allow the on screen QWERTY keyboard of the computational display 23 to be displayed for the user to use.

ADVANTAGES

This present embodiment has several advantages over prior art; some of the advantages will be made apparent below:
a) This present embodiment has a lower cost to manufacture as a standalone accessory add-on.
b) This present embodiment is easier to manufacture as a standalone accessory add-on.
c) This present embodiment is easier to market by complementing a computational display and taking advantage of its popularity.
d) This present embodiment is easier to set up by providing its user with a drop in shell-like member for their computational display.
e) This present embodiment is easier to use, it does not require the user to learn a new technique, only slightly modify the method of use.
f) This present embodiment protects the computational display by providing an exterior protective shell.
g) This present embodiment can be sold at a lower cost compared to a full computational display.
h) This present embodiment provides a superimposed keyboard image layout of its keys and screen data content simultaneously to helping to remind the user of the placement of the keys.
i) This present embodiment allows the user to turn off the superimposed keyboard image providing a cleaner non-cluttered display content on the screen.
j) This present embodiment provides an adjustable intensity of the superimposed keyboard layout from full keyboard image only to full screen data content only and every ration of the two intensities in between.
k) This present embodiment provides a shell-like member comprising of an ergonomically designed keyboard configured for the user to insert and dock a computational display into.
l) This present embodiment provides ease of charging by providing a drop in charging unit.
m) This present embodiment can be adapted to interface with any computational display currently on the market or soon to be on the market by reconfiguring its shell-like member.
n) This present embodiment provides a shell-like member comprising of a docking receptacle matched to interface the users computational display.
o) This present embodiment provides a shell-like member comprising of a docking receptacle configured in its location to interface the users computational display with ease when the user inserts the computational display into this present embodiment.

CONCLUSION, RAMIFICATIONS, AND SCOPE

This present embodiment provides a fast, easy, and convenient way to input data into a computational display. Additionally this present embodiment provides a comfortable layout for inputting data when the user is in a tight environment such as on a plane or on the go (i.e. walking).

With a conventional laptop, the keyboard must be placed on a solid surface such as a the user's lap or a fold out seatback tray, this tight fit causes the screen to be angled downward causing the user to lean downward to see the screen and when typing this can be very difficult and uncomfortable. With newer computational displays that do not have a built in hardware keyboard the viewing angel is corrected, but when attempting to type using the on screen keyboard the computational display must be set down on the tray and again the user must lean forward to see the screen while typing. Additionally the screen content area is reduced due to the area that the on screen keyboard takes.

This present embodiment allows the user to have a full screen area for data as will as allowing the user to input data into the computational display. Additionally, the user does not need to place this present embodiment down on any surface to input data using the full size keyboard, this allows the user to hold the computational display in any position they choose allowing the user to be seated comfortably. Additionally, the user can use this present embodiment while resting their forearms on any surface for additional comfort.

This present embodiment is the only add on accessory that allows the user to input data using a full size keyboard into their computational display while on the go.

Many examples, depictions, drawings, specifications, and such have been given in general regarding this present embodiment. These examples, depictions, drawings, specifications, and such must not be used in limiting the scope of this present embodiment. Altering or evolving this present embodiment can realize other similar embodiments, alterations such as adding, eliminating components and/or parts or using different materials, sizes, colors to perform similar functions, etc. The scope of this present embodiment should be determined by the appended claims and their legal equivalents, rather than by the examples given.

I claim:

1. An article of hardware comprising:
   a shell-like member;
   a mechanism for interfacing;
   a keyboard member comprising a plurality of keys;
   wherein said plurality of keys is a full keyboard;
   wherein said shell-like member is configured to conform to an outer surface of a computational display allowing a computational display screen to be exposed to a user;
   wherein said shell-like member is further configured to secure said computational display into said shell-like member;
   wherein said computational display interfaces with said mechanism for interfacing when said computational display is inserted into said shell-like member;
   wherein said keyboard member is joined on a surface of said shell-like member, said surface opposite to said computational display's screen to be exposed to a user when said computational display is inserted into said shell-like member;
   wherein when user grips said shell-like member with user's palms said keyboard member is facing rearwardly outward from said user, wherein said shell-like member aligns said user's fingers with said keys of said keyboard member;
   wherein said computational display is provided with a superimposed keyboard image on a displayed data content of said computational display so as to align said keyboard image with said keyboard member keys of said article of hardware, wherein said superimposed keyboard image is fully adjustable in its intensity.

2. The article of hardware of claim 1, wherein said shell-like member comprises at least one mechanism for releasing.

3. The article of hardware of claim 1, wherein said shell-like member comprises at least one space bar configured to align the user's thumb and at least one mechanism for gripping when said user grips said shell-like member with their palms.

4. The article of hardware of claim 1, wherein said shell-like member or said keyboard member further comprises a mechanism for interfacing said computational display.

5. The article of hardware of claim 1, wherein said shell-like member comprises at least one feet, said at least one feet comprises a mechanism for charging.

6. The article of hardware of claim 1, wherein said shell-like member comprises at least one mechanism for propping.

7. The article of hardware of claim 1, wherein said shell-like member comprises at least one mechanism for accessing controls.

8. The article of hardware of claim 1, wherein said shell-like member comprises at least one mechanism for adjusting said keyboard member.

9. The article of hardware of claim 1, wherein said shell-like member comprises at least one mechanism for I/O connections.

10. The article of hardware of claim 1, wherein said shell-like member comprises at least one mechanism for drop-in charging.

11. The article of hardware of claim 1, wherein said keyboard member or said mechanism for interfacing is configurable to be disengaged or disabled from said computational display via a hardware or software mechanism, whereby allowing an on screen QWERTY keyboard of said computational display to be displayed for said user to use.

12. A method of providing an article of hardware comprising:
   providing a shell-like member comprising a plurality of keys;
   wherein said plurality of key is a full keyboard;
   providing mechanism for interfacing;
   providing a keyboard member;
   wherein said shell-like member is configured to conform to an outer surface of a computational display allowing a computational display screen to be exposed to a user;
   wherein said shell-like member is further configured to secure said computational display into said shell-like member;
   wherein said computational display interfaces with said mechanism for interfacing when said computational display is inserted into said shell-like member;
   wherein said keyboard member is joined on a surface of said shell-like member, said surface opposite to said computational display's screen to be exposed to a user when said computational display is inserted into said shell-like member;
   wherein when user grips said shell-like member with user's palms said keyboard member is facing rearwardly outward from said user, wherein said shell-like member aligns said user's fingers with said keys of said keyboard member;
   wherein said computational display is provided with a super imposed keyboard image on displayed data content so as to align said keyboard image with said keyboard member of said article of hardware, wherein said superimposed keyboard image is fully adjustable in its intensity.

13. The method of hardware of claim 12, wherein said shell-like member comprises at least one mechanism for releasing and at least one mechanism for accessing controls.

14. The method of hardware of claim 12, wherein said shell-like member comprises at least one space bar configured to align the user's thumb and at least one mechanism for gripping when said user grips said computational display with their palms.

15. The method of hardware of claim 12, wherein said shell-like member or said keyboard member further comprises a mechanism for interfacing said computational display.

16. The method of hardware of claim 12, wherein said shell-like member comprises at least one feet, said at least one feet comprises a mechanism for charging.

17. The method of hardware of claim 12, wherein said shell-like member comprises at least one mechanism for propping.

18. The method of hardware of claim 12, wherein said keyboard member or said mechanism for interfacing is configurable to be disengaged or disabled from said computational display via a hardware or software mechanism, whereby allowing an on screen QWERTY keyboard of said computational display to be displayed for said user to use.

19. The method of hardware of claim 12, wherein said shell-like member comprises at least one mechanism for adjusting said keyboard member.

20. The computational display of claim 12, wherein said shell-like member comprises at least one mechanism for I/O connections.

21. The method of hardware of claim 12, wherein said shell-like member comprises at least one mechanism for drop-in charging.

22. The article of hardware of claim 1, wherein said shell-like member comprises at least one bluetooth connection.

23. The method of hardware of claim 12, wherein said shell-like member comprises at least bluetooth connection.

* * * * *